Patented Jan. 14, 1947

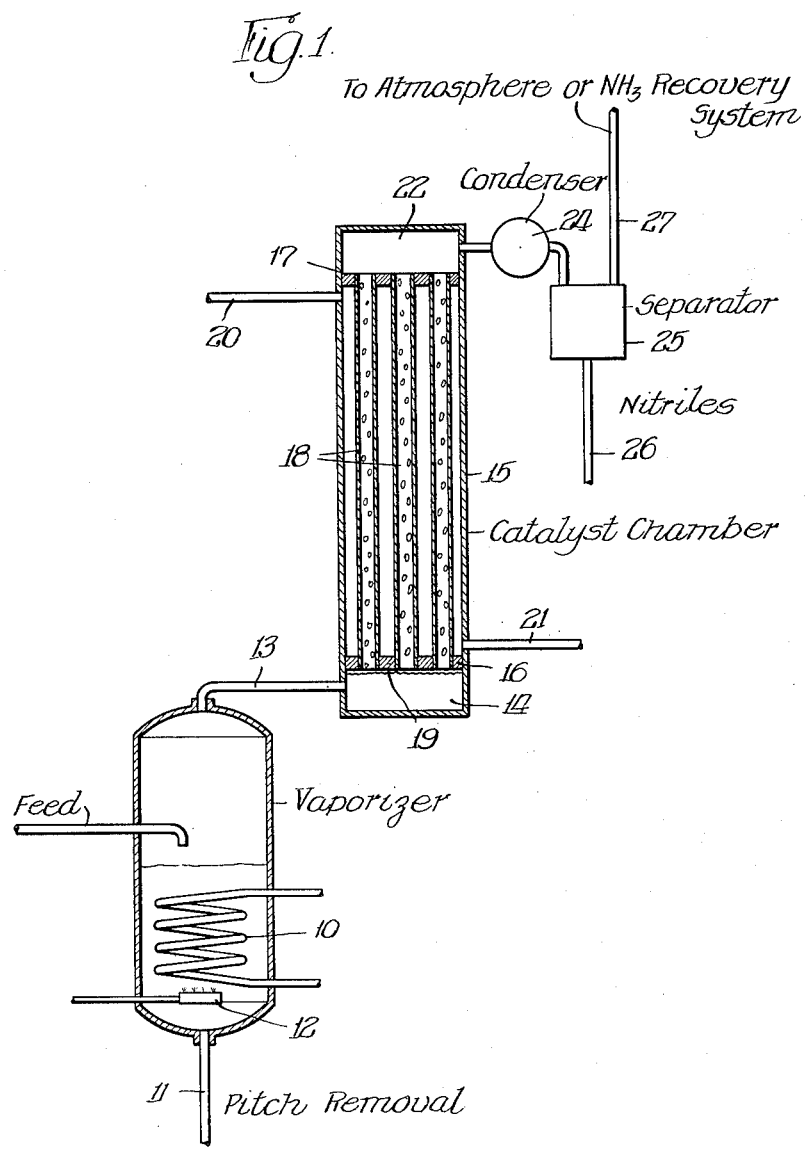

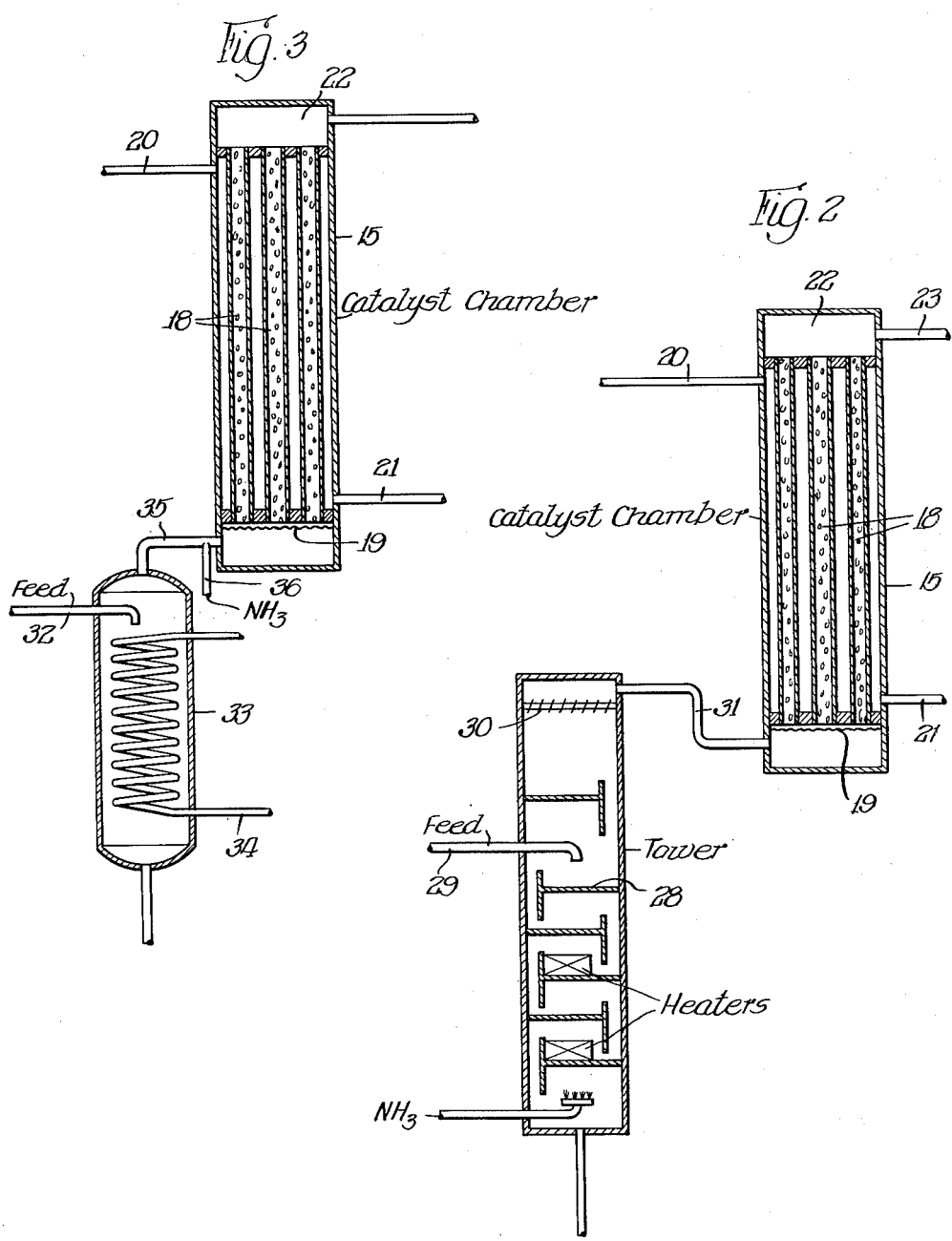

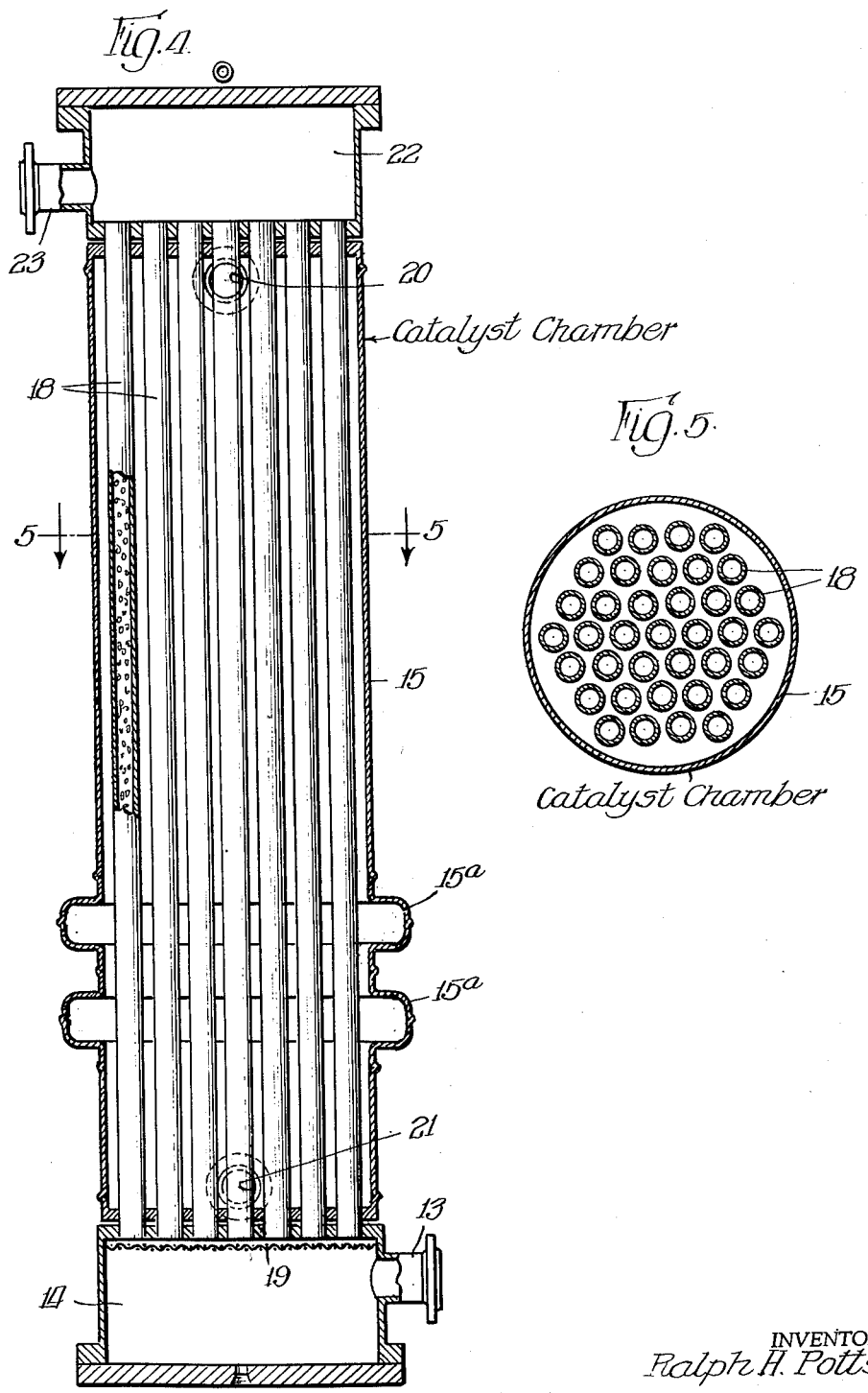

2,414,393

UNITED STATES PATENT OFFICE 2,414,393

PROCESS OF PREPARING NITRILES

Ralph H. Potts, La Grange, Ill., assignor to Armour and Company, Chicago, Ill., a corporation of Illinois Application June 4, 1941, Serial No. 396,512

5 Claims. (Cl. 260—464)

This invention relates to the manufacture of nitriles, particularly aliphatic nitriles having high molecular weight, by the reaction of fatty acids or their esters with ammonia.

In the manufacture of nitriles, a commercial practice has been to react fatty acids with gaseous ammonia at an elevated temperature and to pass the evolved vapors over a dehydrating catalyst. While the process has been useful, one serious disadvantage has been the necessity for heating the vapors to an undesirably high temperature in order to maintain a desired temperature at the point where the vapors contact the catalyst. Another disadvantage has been the fact that optimum temperatures have not been maintained in the area where the vapors are in contact with the catalyst so that the reaction is not as complete as it should be. While the yield obtained is commercial, it is not as high as is desired. A further disadvantage is that in such prior practices where the vapors evolved are subjected to high temperatures, a decomposition of the material occurs, resulting in coking and necessitating frequent shut downs for cleaning. It is never desirable to heat high molecular weight organic materials to high temperatures, and a process which can be conducted at the lowest possible temperature is usually the best, other considerations being equal.

An object of the present invention is to provide a new method for making nitriles in which the temperature of the material passing over the catalyst is maintained within a lower range while at the same time increasing the yield above that of prior methods where higher temperatures were used. Another object is to provide a method for increasing the yield of nitriles by providing a controlled temperature for the materials in contact with the catalyst whereby the materials are maintained in an optimum range of temperatures for the reaction. A further object is to provide a method for producing nitriles while avoiding decomposition of the material, coking, etc. Other specific objects and advantages will appear as the specification proceeds.

The method may be carried on in varied types of apparatus. For the purpose of illustrating and clarifying the invention, the invention will be described with reference to the apparatus shown in the accompanying drawings, in which—

Figure 1 is a vertical sectional view, with some parts in side elevation, of one form of apparatus in which the invention may be practiced; Fig. 2, a view similar to Fig. 1, of another form of apparatus in which the method may be employed; Fig. 3, a view similar to Fig. 1, but showing another form of apparatus in which the invention may be practiced; Fig. 4, an enlarged vertical sectional view showing a catalyst chamber which may be used in the practice of the invention; and Fig. 5, a transverse sectional view, the section being taken as indicated at line 5—5 of Fig. 4.

Referring first to the structure shown in Figs. 1, 4 and 5, feed stock is introduced into the vaporizer chamber having a heating coil 10 in the lower portion thereof through which heating fluid may be passed, and having also an outlet pipe 11 in the lower portion thereof for the removal of pitch, etc. Ammonia in gaseous form is introduced through a pipe and thence through a distributing head 12 in the lower portion of the vaporizer drum. Feed stock containing fatty acids or their esters is preferably fed continuously into the upper portion of the vaporizer drum. It will be understood that the feed stock, as well as the ammonia, may be passed through pre-heaters or other apparatus before being introduced into the vaporizer. Preferably, the feed stock is heated in a pre-heater to a temperature above 400° F. Usually I attempt to maintain the temperature of the fatty substance at the point where it is introduced into the vaporizer at about 550° F. The preferable temperature will depend somewhat on the kind of acid used.

The ammonia is preferably pre-heated prior to its introduction into the vaporizer to a temperature in the neighborhood of 550° F. and it is continuously introduced in gaseous form into the lower portion of the liquid fatty substance in the vaporizer drum. The gaseous ammonia is thus intimately mixed with the fatty substance during the time the substance remains in liquid state. In order to maintain the ammonia in contact with the liquid acid substance until the initial reaction takes place, the heat supplied through coil 10 and the quantity of stock introduced into the chamber are so regulated that the stock remains in contact with the ammonia for a period preferably averaging in excess of forty five minutes. Thus, with a greater amount of heat supplied through coil 10, it is necessary to discharge acid stock into the vaporizer at a more rapid rate so that the liquid body within the chamber will not be destroyed through more rapid vaporization or the time of contact between the liquid acid substance and the ammonia be decreased to the point where reaction is avoided.

The vapors evolved in the vaporizer drum pass upwardly through the pipe 13 into the header 14 in the bottom of the catalyst chamber 15.

The catalyst chamber structure 15 comprises a casing having a header plate 16 spaced from the bottom portion of the casing and a header plate 17 spaced from the top portion of the casing. In the plates are mounted a large number of closely spaced tubes 18. The tubes are filled with a catalyst $Al_2O_3$ or with any other suitable dehydrating catalyst. The catalyst is supported within the tubes upon a screen 19 just below the plate 16. The area within the header plates 16 and 17 and about the tubes 18 is heated by a mixture of diphenyl and diphenyl oxide, pipes for the inlet and outlet of the fluid being indicated by the numerals 20 and 21. The vapors, after passing through the tubes 18, are received within an upper header chamber 22, and thence pass outwardly through pipe 23 to the condenser 24. From the condenser the material passes to a separator 25, of well known construction, and nitriles are withdrawn through line 26. From the top of the separator the vapors pass through line 27 to the atmosphere or to an ammonia recovery system, which is well known.

I have found that a greater yield can be obtained and a better product produced through the maintenance of a relatively low range of temperatures in the catalyst zone. If the catalyst is heated substantially above 700° F., I find that the good results diminish, while if the temperature falls below 570° F., the yields drop sharply. By passing a heating fluid through the body of the vapors while the same are in contact with the catalyst, so that the vapor body has a relatively uniform temperature throughout within the range of 570° F. to 700° F., a very substantial increase in yield is obtained. In comparison with the previous practice described, in which the vapors were first heated and then passed over a catalyst maintained in a body, I found that about a fifty percent increase in throughput occurred as a result of the new method, the actual throughput being about seventy five pounds of fatty acid stock per hour as compared with about fifty pounds per one hundred pounds of catalyst in the previous practice. By maintaining the catalyst within a range of temperatures which I find to be an optimum range for the reaction and by maintaining the temperature uniformly throughout the mass of catalyst, a much greater yield in nitriles is obtained. Further, since the temperature of the heating fluid does not substantially exceed 700° F., substantially no decomposition of material occurs and there is no coking of the apparatus.

The advantages of the process are further enhanced by using a heated fluid, such as a mixture of diphenyl and diphenyl oxide, which condenses to a liquid at a temperature of between 600° F. and 700° F. under the conditions of the process. This causes the heat of reaction to be supplied throughout the reaction zone at a substantially constant temperature. Wherever and whenever reaction takes place the heat of reaction is immediately supplied at that point by condensation of more heating fluid. In this way, the temperature is not reduced at such point as in the prior processes, but is maintained at a constant level.

In the illustration given in Fig. 2, the feed is passed into a tower equipped with receptacles consisting of bubble trays and plates, indicated by the numeral 28. Any suitable number of trays may be used and the tower may be of any suitable size and height. For the purpose of clarity of illustration, the tower shown schematically and with a much fewer number of bubble trays and plates than would ordinarily be used. Ammonia in gaseous form is introduced into the bottom of the tower and the resulting vapors passed through a baffle 30 and thence through line 31 into the catalyst chamber 15, where the operation is identical with that heretofore described in connection with the structure shown in Figs. 1, 4 and 5.

In the modification shown in Fig. 3, pre-heated feed stock is fed through line 32 into the top of the drum 33, heated by coil 34. The evolved vapors pass through pipe 35 into the catalyst chamber 15, which is identical with the chamber heretofore described. The vapors passing through line 35 are joined and mingled with gaseous ammonia, which is introduced through the line 36. The mixed ammonia and fatty acid vapors pass into the lower header chamber 14, thence upwardly through the tubes 18. The temperature of the mixed vapors is maintained as has been described heretofore in connection with the structure of Fig. 1. From the upper header 22 the vapors pass through a condenser and separator, as has heretofore been described.

The enlarged structures shown in Figs. 4 and 5 illustrate with more clarity the structure 15 shown in the other figures. There are a few details shown in Fig. 4 which do not appear in the smaller figures, such as the expansion joint portions 15a, but which do not affect the principle of the invention herein described.

While I have illustrated the evolving of vapors from three different types of structures and the subsequent treatment thereof, it will be understood that the invention is not limited to such specific methods for envolving vapors and that the vapors treated in contact with the catalyst, according to my invention, may be produced or evolved in any desired manner or in any suitable structure.

I claim:

1. In a method for preparing aliphatic nitriles in which a fatty substance chosen from a group consisting of fatty acids of at least six carbon atoms and esters thereof is reacted at elevated temperatures with gaseous ammonia, the steps of introducing the vapor of said fatty substance and gaseous ammonia into a reaction zone and in contact with a dehydrating catalyst, and bringing into heat transfer relation with said zone a vaporous heating medium having a boiling point between 570° F. and 700° F., said medium being at a temperature above the boiling point thereof whereby the endothermic reaction between the vaporous fatty substance and the gaseous ammonia proceeds in the zone and a portion of the medium is condensed as heat is absorbed by the reaction, the latent heat of vaporization of the medium causing heat to be imparted to the reaction zone while the temperature of the zone and the products therein is maintained at the boiling point of the medium.

2. In a method for preparing aliphatic nitriles in which a fatty substance chosen from a group consisting of fatty acids of at least six carbon atoms and esters thereof is reacted at elevated temperatures with gaseous ammonia, the steps of introducing the vapor of said fatty substance and gaseous ammonia into a reaction chamber and in contact with a dehydrating catalyst, introducing into contact with the chamber in heat transfer relation with the fatty substance and gaseous ammonia therein a vaporous heating medium having a boiling point between 570° F. and 700° F., said vaporous heating medium when introduced being at a temperature above the boiling point thereof, whereby the reaction between the vaporous fatty substance and the gaseous ammonia proceeds and takes up heat within the chamber and a portion of the medium is condensed, the latent heat of vaporization of the medium causing heat to be imparted to the reaction chamber while the temperature of the chamber and the products therein is maintained at the boiling point of the medium, and withdrawing the condensate of the medium.

3. In a method for preparing aliphatic nitriles in which a fatty substance chosen from a group consisting of fatty acids or at least six carbon atoms and esters thereof is reacted at elevated temperatures with gaseous ammonia, the steps of introducing vapor of said substance and gaseous ammonia in a narrow confined stream into contact with a dehydrating catalyst, bringing into heat transfer relation with said steam to control the temperature of the products therein a vaporized heating medium having a boiling point between 570° F. to 700° F., said vaporized heating medium being at a temperature above the boiling point thereof whereby as the endothermic reaction between said fatty substance and said ammonia proceeds a portion of the medium is condensed and the latent heat of vaporization of the medium causes heat to be imparted to the confined stream while the temperature of the stream and the products therein is maintained at the boiling point of the medium.

4. In a method for preparing aliphatic nitriles in which a fatty substance chosen from a group consisting of fatty acids of at least six carbon atoms and esters thereof is reacted at elevated temperatures with gaseous ammonia, the steps of vaporizing said fatty substance, mixing the vapor of said fatty substance with gaseous ammonia at a temperature below 570° F., introducing the mixture in a plurality of narrow confined streams into contact with a dehydrating catalyst, bringing into heat transfer relation with each of said streams to control the temperature of the products therein a vaporized heating medium having a boiling point between 570° F and 700° F., said vaporized heating medium being at a temperature above the boiling point thereof whereby as the endothermic reaction between the gaseous ammonia and the fatty substance proceeds a portion of the medium is condensed and the latent heat of vaporization of the medium causes heat to be imparted to each of the streams while the temperature of each of the streams and the products therein is maintained at the boiling point of the medium.

5. The process of preparing aliphatic nitriles which comprises reacting a fatty substance chosen from the group consisting of fatty acids of at least six carbon atoms and esters thereof, while in liquid phase, with gaseous ammonia to effect conversion of a part of said substance to nitriles, thus producing a liquid mixture containing nitriles, vaporizing said mixture, passing vapors into a restricted zone in which they are contacted with a dehydrating catalyst, and introducing into said zone a vaporous heating medium having a boiling point between 570° F. and 700° F., said vaporous heating medium being at a temperature above the boiling point thereof whereby as the catalytic endothermic reaction between the fatty substance and the ammonia proceeds a portion of the medium is condensed and the latent heat of vaporization of the medium causes heat to be imparted to the reaction zone while the temperature of the zone and the products therein is maintained at the boiling point of the medium.

RALPH H. POTTS.